June 28, 1932.　　L. J. STEELE ET AL　　1,864,696
PROJECTION OF LIGHT
Filed Sept. 14, 1926　　2 Sheets-Sheet 1
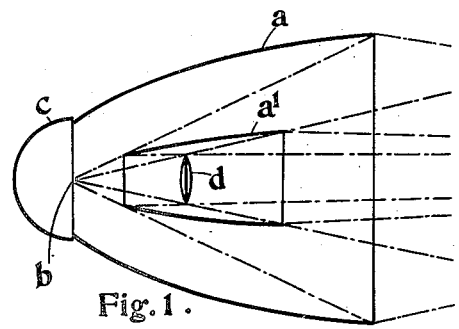
Fig. 1.
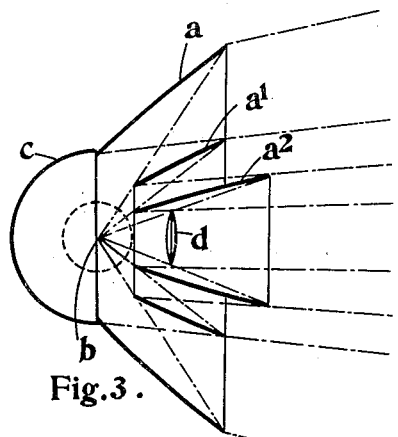
Fig. 3.
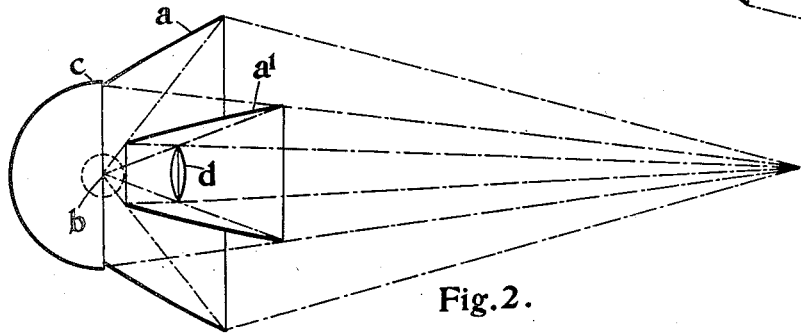
Fig. 2.
Fig. 4.
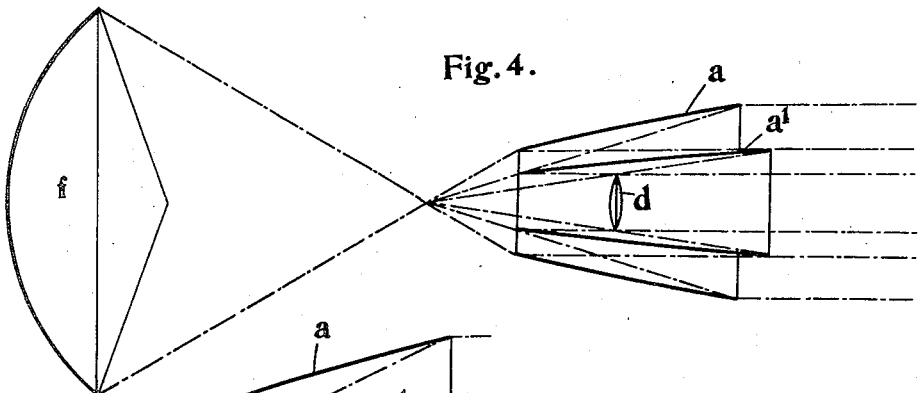
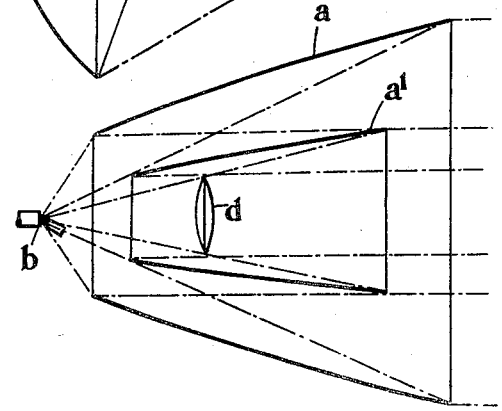
Fig. 5.
Inventors
L. J. Steele:
H. Martin:
by
W. E. Evans:
Attorney.

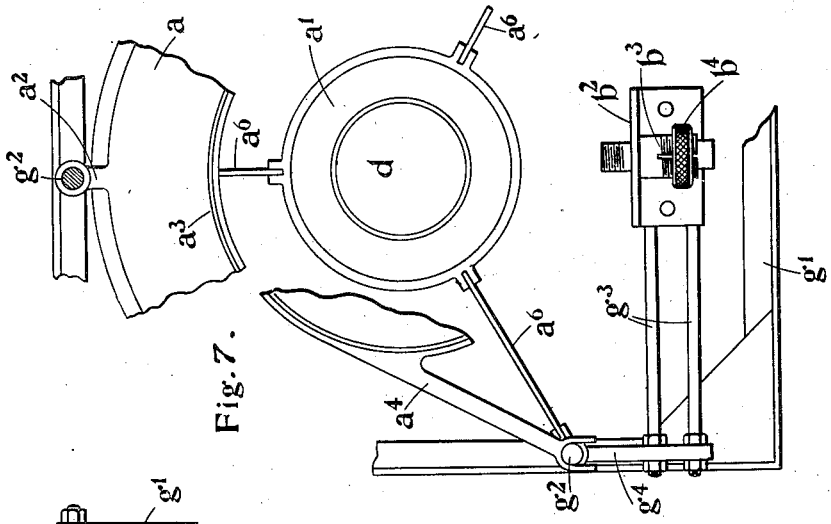
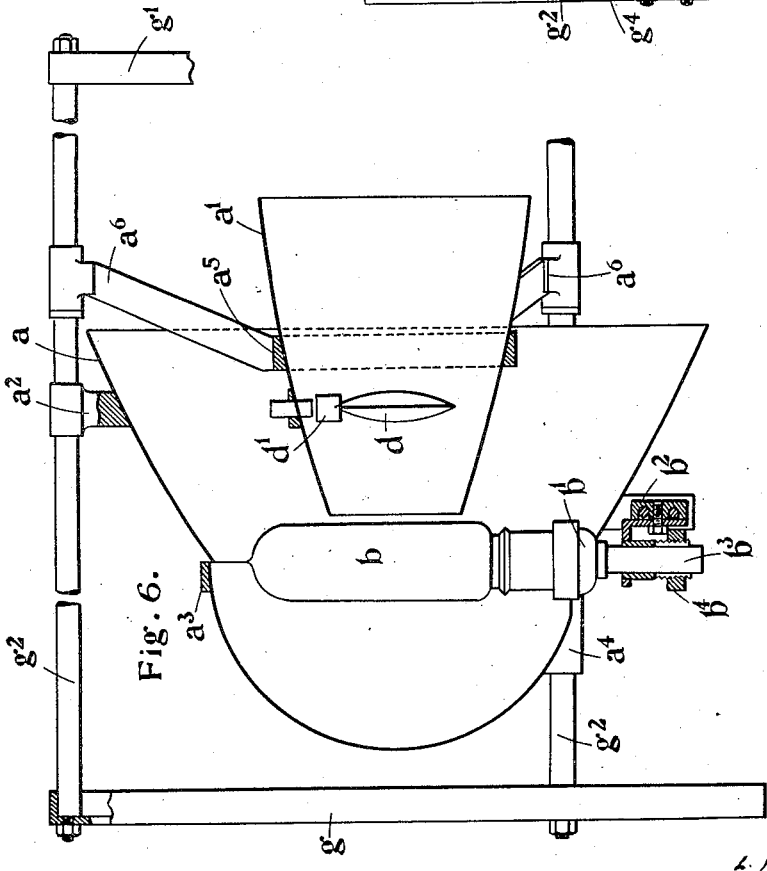

Patented June 28, 1932

1,864,696

UNITED STATES PATENT OFFICE

LOUIS JOHN STEELE AND HAROLD MARTIN, OF PORTSMOUTH, ENGLAND

PROJECTION OF LIGHT

Application filed September 14, 1926, Serial No. 135,414, and in Great Britain September 10, 1925.

This invention relates to a system or combination of reflecting or of reflecting and refracting elements, comprising mirrors, lenses and/or prisms, and a suitable source of light, for use in signalling projector apparatus and the like, and which may be used in substitution or for the modification of the arc system of projection now in general use.

The invention comprises method and means of conserving for the purposes of projection, by adding or combining, nearly the whole of the luminous rays emitted from a light source, and comprises the features hereinafter described.

According to the invention two or more ellipsoidal or hyperbolic reflectors are disposed concentrically one within the other with their foci coincident, the source of light being disposed substantially at the coincident foci of the reflectors.

According to the invention, moreover, two reflectors or reflecting systems are used in conjunction with a single refracting system, and there is furthermore no crossing of the beams which are dealt with by the reflecting and refracting systems respectively.

The refracting system, which is relatively small and inexpensive to manufacture, is preferably contained within the ellipsoidal reflecting system, so as to produce a single combined narrow beam which is satisfactory for projecting purposes.

According to the invention, moreover, the whole of the light emitted from the source is dealt with by means of reflecting surfaces, with the exception of the relatively small front zone which may be dealt with by means of a single refracting system such as a biconvex lens.

The invention further comprises the features hereinafter described.

The invention is hereinafter described by way of example with reference to the accompanying diagrammatic drawings, in which Figure 1 is a diagram illustrating an arrangement of reflecting and refracting elements according to the invention in which two ellipsoidal reflectors are provided co-axially, Figure 2 shows a similar arrangement to Figure 1 in which the outer ellipsoidal reflector is reduced in length and in which the inner ellipsoidal reflector extends beyond the front or outer end of the outer ellipsoidal reflector, Figure 3 is a view illustrating a further modification in which the main reflectors are hyperbolic and three in number, Figure 4 is a diagram illustrating a further modification in which, instead of providing a source of light at or adjacent to the focus of the main reflector, a separate projector is provided the beam from which converges upon the focus of the main reflector, Figure 5 is a diagram illustrating the application of the invention to direct arc projection, and Figures 6 and 7 are views in sectional elevation and cross-section respectively illustrating a constructional form of the apparatus illustrated in Figure 2.

According to the construction illustrated in Figure 1, the ellipsoidal reflector $a$ is provided in a multiple form consisting of two ellipsoidal reflectors $a$, $a^1$ or more, concentric with a common major axis and each having the same conjugate foci. The outer and larger ellipsoidal reflector $a$ is so dimensioned at its rear end as to permit of the ready insertion of a suitable source of light $b$, preferably enclosed in a suitable bulb, and is cut off at its front end preferably so that the maximum projection angle at the conjugate focus, of the beam of light converging from the outer reflector $a$, does not exceed that which is permissible in accordance with the purpose for which the projection apparatus is intended to be used. Under these conditions it is found that an outer ellipse of reasonable dimensions, and subject to the limiting condition before referred to, as to the maximum projection angle of the beam, can only deal with a part of the front zone of light derived from, or reflected through the source of light $b$. The remaining part of the front light which does not meet the outer ellipsoidal reflector $a$, more particularly where the outer ellipsoidal reflector $a$ is reduced in length as illustrated in Figure 2, cannot effectively be dealt with by means of a single refractor such as $d$ or the like, and accordingly the second or inner concentric ellipsoidal reflector $a^1$ is provided, so arranged and dimensioned relatively to the outer or larger reflector $a$, as to deal effectively with a further large proportion of the light emitted from the source. This second or inner ellipsoidal reflector $a^1$ is preferably cut off at its front end at a plane or zone of intersection determined by the converging rays reflected from the inner edge of the large outer ellipsoidal reflector $a$ at its rear end, and the frontal diverging rays passing from the source of light at a comparatively small angle. The inner small ellipsoidal reflector $a^1$ is truncated at its rear end, at the zone of intersection between this small ellipsoidal reflector and the diverging rays passing from the source of light $b$ situated at the focus to the outer edge of the large or outer ellipsoidal reflector $a$.

By such means the projection angle may be reduced without involving the use of a relatively long and therefore large and expensive ellipsoidal reflector, or of a suitable additional refracting system which inevitably absorbs a large part of the light emitted from the source $b$. It is preferred to cut away the rear end of the ellipsoidal reflector $a$ at or adjacent to the plane passing through the focal point at which the source of light $b$ is placed, and to provide a hemispherical reflector $c$ having its centre coincident with the focus of the main reflector, but the hemispherical reflector is not essential. Such a compound ellipsoidal reflecting system consisting of two concentric ellipsoidal reflectors $a, a^1$ is suitable for general purposes.

By utilizing the two concentrically arranged ellipsoidal reflectors $a, a^1$ (Figure 1) immediately before described, the greater part of the front light from the source is reflected in rays converging at the conjugate focus. Such a system is therefore specially suited for frontal arc projection. The small remaining inner frontal zone of light consisting of diverging rays which do not meet the inner reflector $a^1$, and which would otherwise not be utilized by the projection system, may be largely conserved and utilized, and brought to converge at the conjugate focus by means of a single inner refracting system $d$ which however is not essential. The position and dimensions of this refracting system $d$ which must be suspended inside the inner ellipsoidal reflector $a^1$ are determined by the zone of intersection between the rays of light diverging from the source to the outer edge of the inner ellipsoidal reflector $a^1$, and those converging from the inner edge of the inner ellipsoidal reflector $a^1$ to the conjugate focus.

As illustrated in Figure 2 the outer ellipsoidal reflector $a$ may be reduced in length and the inner ellipsoidal reflector $a^1$ may extend beyond the front or outer end of the outer ellipsoidal reflector $a$ which may be closed at the rear end by a hemispherical reflector.

Whereas the systems or combinations hereinbefore described appear to be primarily of value when used as described with the main ellipsoidal reflector $a$ in conjunction with a suitable externally arranged accessory hemispherical reflector $c$ and provided internally with a suitable refractor $d$, the system or combination referred to would also appear to be applicable and capable of equivalent arrangement, more particularly where a multiple main reflector is provided, if, for the main ellipsoidal reflector, another reflector be substituted of the focussing type, such as one which is hyperbolic in shape, with the object of producing, instead of a converging beam as obtained with the main ellipsoidal reflector, a diverging beam with a main hyperbolic reflector.

It may be advantageous in applying the system to a main compound hyperbolic reflector to make this compound reflector in more than two parts for example, three parts $a, a^1, a^2$ as illustrated in Figure 3, more particularly in the case of a beam of fairly wide angle being desired.

With the improved system or combination hereinbefore described, and applied to various forms of main compound focussing type reflector, it is possible to cover a wide range of devices for the effective projection of light preferably derived from a source consisting of an electric incandescent lamp. For instance, with a main compound ellipsoidal reflector, converging rays are obtained suitable for optical lantern projection for use in the case either of cinema films or slides.

When the system is applied to main compound reflectors of the hyperbolic type, it may be utilized for flood lighting, for head lamps and for portable hand lamps, and the like.

Instead of providing a hemispherical reflector at the rear end of the main reflector $a$ and the source of light at the focus of the main reflector $a$, a separate projecting system $f$ having, for example, an ellipsoidal reflector may be provided, the beam from this projector converging to the focus of the main reflector $a$ which in the case illustrated in Figure 4 is parabolic, but may be ellipsoidal or hyperbolic according to the use for which the apparatus is intended.

Figure 5 illustrates a suitable arrangement of the reflecting and refracting elements for use in direct arc projection, and shows the application of inner and outer parabolic reflectors, but it will be understood that ellipsoidal reflectors may be used with advantage.

A practical construction in which reflecting and refracting elements are provided, for example, as illustrated diagrammatically in Figure 2 is hereinafter described with reference to Figures 6 and 7. A framework comprising end members $g$, $g^1$ and parallel disposed connecting rods or bars $g^2$ is provided. The connecting rods or bars $g^2$ are preferably three in number, one being provided in a central and upper position and the two remaining rods or bars being disposed in positions 120° from the upper rod or bar. The main ellipsoidal or other reflector $a$ is slidably mounted upon the connecting rods or bars $g^2$ by means of a lug $a^2$ adapted to slide upon the upper rod or bar $g^2$ and by means of a fitting $a^3$ comprising a pair of laterally and downwardly extending arms $a^4$, which fitting $a^3$ may be connected to the exterior of a hemispherical reflector $c$ adjacent the junction between the outer ellipsoidal reflector $a$ and the hemispherical reflector $c$. The laterally and downwardly extending arms $a^4$ are forked or otherwise formed at their lower extremities to engage with the respective lower connecting rods or bars $g^2$. By such means it will be understood that the ellipsoidal reflector $a$ together with the hemispherical reflector $c$ attached to its rear end is slidably mounted upon the upper and lower connecting rods or bars $g^2$. The inner ellipsoidal reflector $a^1$ is conveniently slidably mounted upon the upper and lower connecting rods or bars $g^2$ by means of a spider fitting $a^5$ having three arms $a^6$ disposed, for example, in equiangular positions, adapted at their outer ends to engage with the respective upper and lower connecting rods or bars $g^2$. A refracting system, comprising, for example, a double convex lens $d$, may be suspended by means of a fitting $d^1$ from the inner ellipsoidal reflector $a^1$. The source of light $b$ may comprise an incandescent electric lamp which may be vertically disposed and may be mounted in a socket $b^1$ carried by a fitting $b^2$ in which it may be adjustable vertically by means comprising a split sleeve $b^3$ and a milled clamping nut $b^4$. The fitting $b^2$ may be carried by means of a pair of laterally disposed rods $g^3$ which are connected at their ends to vertically disposed members $g^4$ which are suspended from the two lower connecting rods or bars $g^2$, and the fitting $b^2$ may be laterally adjustable upon the laterally disposed rods $g^3$. It will be understood that a similar or equivalent construction may be employed with reference to any of the systems or combinations of reflecting or refracting elements described.

It will be understood that a large range of adjustment is possible and desirable in the relative arrangement and dimensions of the various parts of apparatus according to the invention, to meet various requirements, but, in general, the principle of truncating the rear end of the outer main reflector at or adjacent the plane passing through the focal point at which the source of light is placed would appear to apply when one object in view is to construct the apparatus as compactly and cheaply as possible, having regard to the desirability for inserting through the rear end of the main reflector the bulb of the lamp forming the source of light.

A further advantage of the use of the hemispherical reflector behind the lamp bulb is that the rays of light reaching its surface are reflected radially back through the light source, with a consequent minimum interference effect produced by the lamp bulb.

The invention may comprise an alternative involving the use of a light source in a bulb having its lamp-holder in front rather than at the rear, relative to the direction of the projection, but this arrangement is not preferred.

It will be understood that the features of method and apparatus described are also advantageously applicable according to the invention for the purpose of adding and combining beams of light.

The whole of the apparatus as hereinbefore described in accordance with this invention can be readily constructed in a compact, simple and inexpensive form for the respective purpose for which it may be intended.

We claim:

1. Means for the production of a beam of light of high intensity, consisting of a plurality of annular concentric reflectors having a common axis, each of which is formed by a surface of revolution generated by a conic section rotated about the common axis and having coincident foci, a source of light disposed to the rear of the said reflectors, and a supporting frame comprising a plurality of guide members parallel with the axis of the reflectors and spaced around the said reflectors, upon which the said reflectors and the source of light are positioned.

2. Means for the production of a beam of light of high intensity, consisting of a plurality of annular concentric reflectors having a common axis, each of which is formed by a surface of revolution generated by a conic section rotated about the common axis and having coincident foci, a refracting system disposed within the said reflectors, a source of light disposed to the rear of the said reflectors, and a supporting frame comprising a plurality of guide members parallel with the axis of the reflectors and spaced around the said reflectors, upon which the said reflectors and the source of light are positioned.

3. Means for the production of a beam of light of high intensity, consisting of a plurality of annular concentric reflectors having a common axis, each of which is formed by a surface of revolution generated by a conic section rotated about the common axis and having coincident foci, a refracting system disposed within the said reflectors, a source of light disposed to the rear of the said reflectors, a hemispherical reflector disposed to the rear of the source of light, and a supporting frame comprising a plurality of guide members parallel with the axis of the reflectors and spaced around the said reflectors, upon which the said reflectors and the source of light are positioned.

4. Means for the production of a beam of light of high intensity, consisting of a plurality of annular concentric reflectors having a common axis, each of which is formed by a surface of revolution generated by a conic section rotated about the common axis and having coincident foci, a source of light disposed to the rear of the said reflectors, a hemispherical reflector disposed to the rear of the source of light, and a supporting frame comprising a plurality of guide members parallel with the axis of the reflectors and spaced around the said reflectors, upon which the said reflectors and the source of light are positioned.

5. Means for the production of a converging beam of light of high and uniform intensity suitable for cinematographic projection and other purposes, consisting of a plurality of truncated concentric ellipsoidal reflectors disposed about a common axis and having coincident foci, a source of light occupying the said coincident foci and a refracting system disposed within the said ellipsoidal reflectors which extend forwardly of the said coincident foci, the inner of which have their truncation determined by the non-reflected rays of light which impinge upon the forward edge and the converging rays of light reflected by the rearward edge of the next outer ellipsoidal reflector respectively, the refracting system having its dimensions and position similarly determined with respect to the inner ellipsoidal reflector and being of an optical form to converge the rays of light falling upon it to the conjugate and coincident foci of the ellipsoidal reflectors.

6. Means for the production of a converging beam of light of high and uniform intensity suitable for cinematographic projection and other purposes, consisting of a plurality of truncated concentric ellipsoidal reflectors disposed about a common axis and having coincident foci, a source of light occupying the said coincident foci, a hemispherical reflector to the rear of the source of light with its centre at the coincident foci and adapted to reflect rearwardly directed rays of light through the said coincident foci, and a refracting system disposed within the said ellipsoidal reflectors which extend forwardly of the said coincident foci and the inner of which have their truncation determined by the non-reflected rays of light which impinge upon the forward edge and the converging rays of light reflected by the rearward edge of the next outer ellipsoidal reflector respectively, the refracting system having its dimensions and position similarly determined with respect to the inner ellipsoidal reflector and being of an optical form to converge the rays of light falling upon it to the conjugate and coincident foci of the ellipsoidal reflectors.

7. Means for the production of a converging beam of light of high and uniform intensity suitable for cinematographic projection and other purposes, consisting of a plurality of truncated concentric ellipsoidal reflectors disposed about a common axis and having coicident foci, a frontal arc disposed to the rear of the reflectors at the said coincident foci and a refracting system disposed within the said ellipsoidal reflectors which extend forwardly of the said coincident foci and the inner of which have their truncation determined by the non-reflected rays of light which impinge upon the forward edge and the converging rays of light reflected by the rearward edge of the next outer ellipsoidal reflector respectively, the refracting system having its dimensions and position similarly determined with respect to the inner ellipsoidal reflector and being of an optical form to converge the rays of light falling upon it to the conjugate and coincident foci of the ellipsoidal reflectors.

8. Means for the production of a converging beam of light of high and uniform intensity suitable for cinematographic projection and other purposes, consisting of a plurality of truncated concentric ellipsoidal reflectors disposed about a common axis and having coincident foci, a projector of light disposed to the rear of the said ellipsoidal reflectors and throwing a beam of light which is focussed upon the said coincident foci and a refracting system disposed within the said ellipsoidal reflectors which extend forwardly of the said coincident foci and the inner of which have their truncation determined by the non-reflected rays of light which impinge upon the forward edge and the converging rays of light reflected by the rearward edge of the next outer ellipsoidal reflector respectively, the refracting system having its dimensions and position similarly determined with respect to the inner ellipsoidal reflector and being of an optical form to converge the rays of light falling upon it to the conjugate and coincident foci of the ellipsoidal reflectors.

LOUIS JOHN STEELE.
HAROLD MARTIN.